United States Patent [19]

Haas, Jr.

[11] Patent Number: 4,672,966
[45] Date of Patent: Jun. 16, 1987

[54] DEVICE FOR ATTACHING AN IDENTIFICATION TAG TO AN EAR OR THE LIKE OF AN ANIMAL

[76] Inventor: Elmer J. Haas, Jr., P.O. Box 128, Dayton, Ky. 41074

[21] Appl. No.: 713,991

[22] Filed: Mar. 20, 1985

[51] Int. Cl.⁴ ............................................. A01K 11/00
[52] U.S. Cl. ...................................... 128/330; 227/144
[58] Field of Search .................. 128/330, 316, 334 C; 227/15, 144

[56] References Cited

U.S. PATENT DOCUMENTS

| | | | |
|---|---|---|---|
| 4,365,411 | 12/1982 | Muldoon | 227/144 X |
| 4,368,735 | 1/1983 | Filmer | 128/330 |
| 4,552,147 | 11/1985 | Gardner | 128/330 |

FOREIGN PATENT DOCUMENTS

| | | | |
|---|---|---|---|
| 156220 | 7/1953 | Australia | 128/316 |
| 161515 | 4/1921 | United Kingdom | 128/330 |

*Primary Examiner*—Michael H. Thaler
*Attorney, Agent, or Firm*—James W. Pearce; Roy F. Schaeperklaus

[57] ABSTRACT

A tool for attaching an identification tag body and a tag retainer to an ear of an animal. The tool includes a main handle member and a first bracket pivotally mounted on the main handle member. An opening in the first bracket receives a hollow boss of the tag body. A second bracket is pivotally mounted on the main handle member. A boss on the second bracket is received inside the hollow boss of the tag body when in a tag body supporting position. A link assembly is pivotally mounted on the main handle member. A drive pin member receives the tag retainer. The drive pin is resiliently mounted on the link assembly and is urged toward a position in which the tag retainer enters the hollow of the boss of the tag body as the link assembly is advanced in a retainer actuating direction. The link assembly is driven in retainer actuating direction to drive the tag retainer through the ear of the animal and into position for holding by the boss of the tag body. The second bracket is advanced to released position by the tag retainer. The first bracket can swing free to release the tag and the tag retainer from the tool as the link assembly falls away from the main handle member.

7 Claims, 15 Drawing Figures

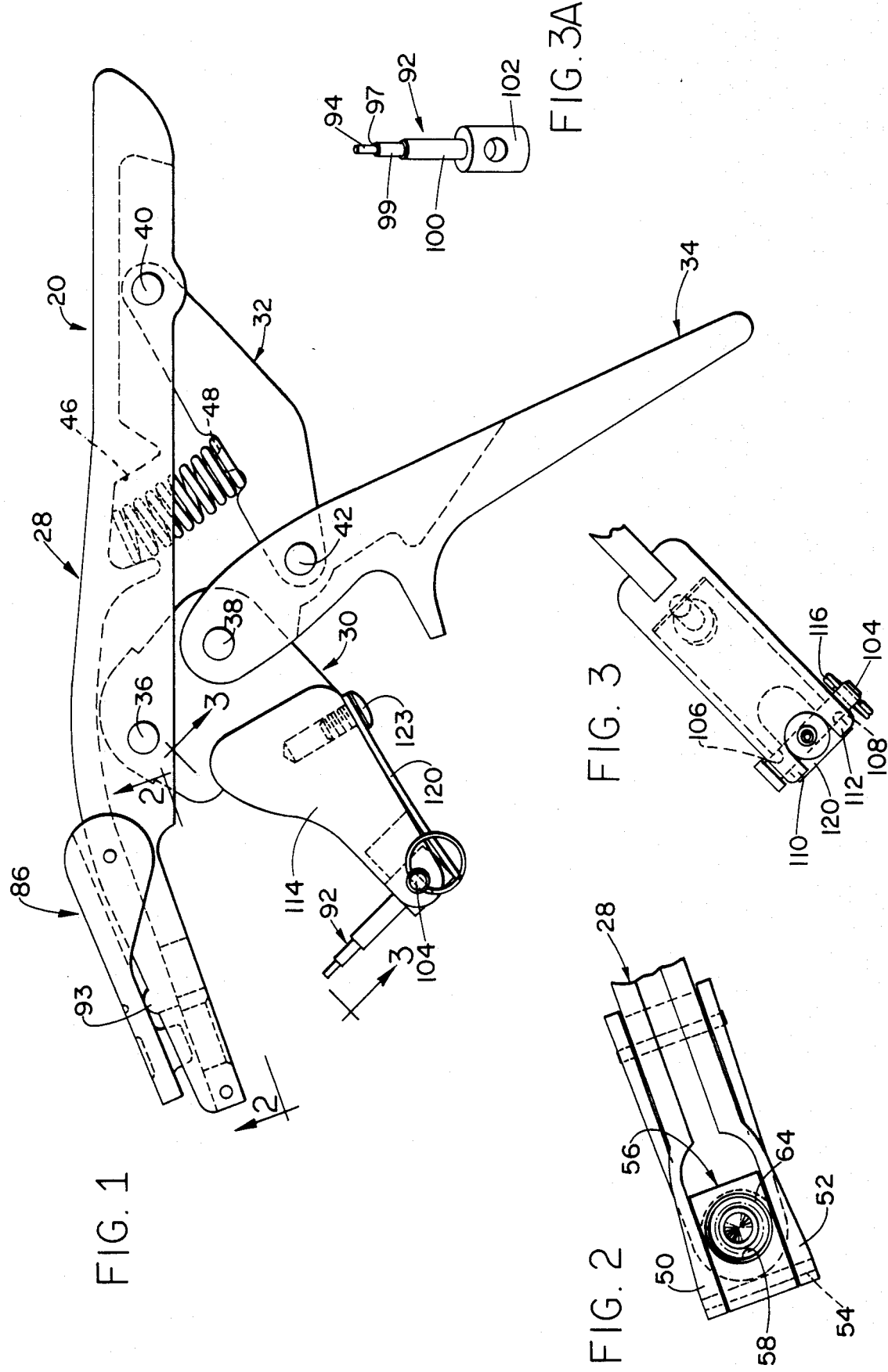

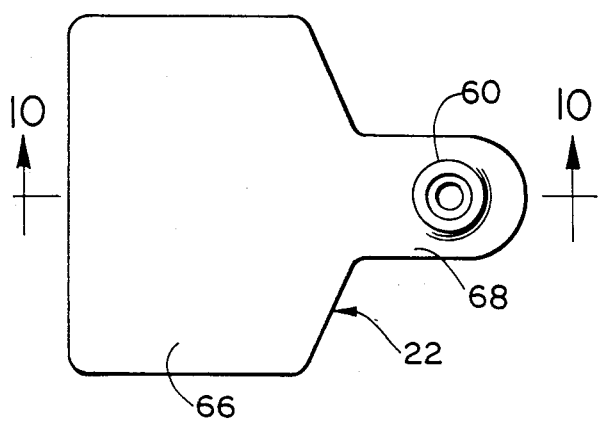
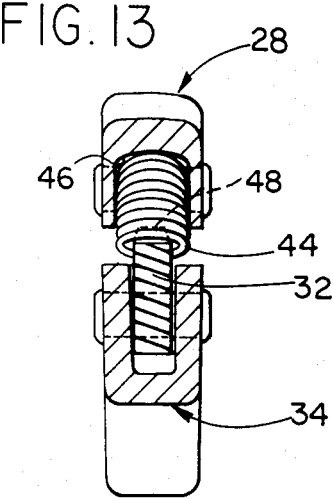
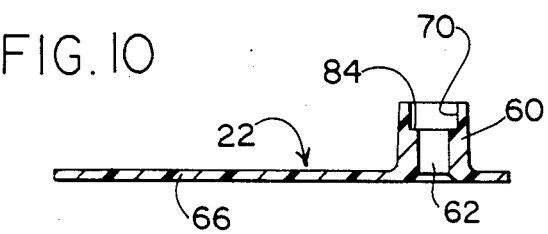
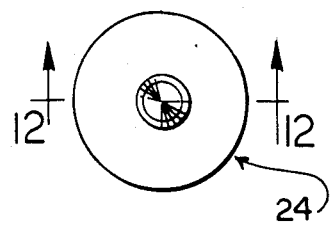
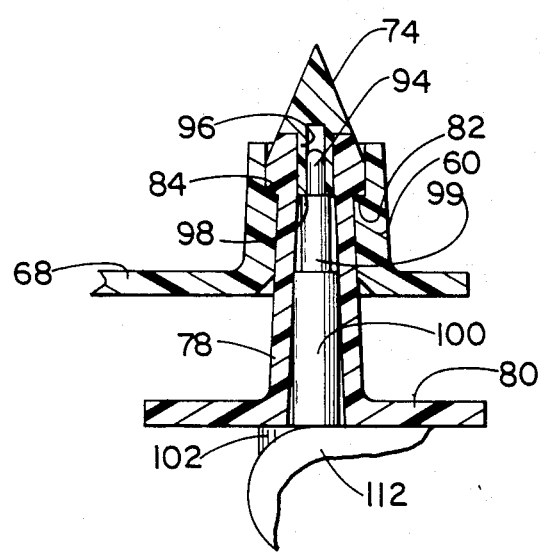
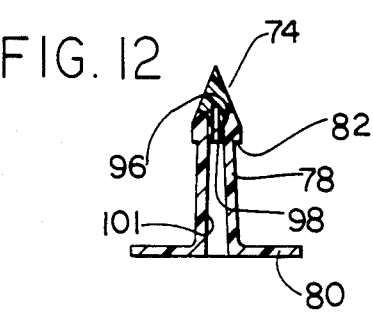

DEVICE FOR ATTACHING AN IDENTIFICATION TAG TO AN EAR OR THE LIKE OF AN ANIMAL

BACKGROUND OF THE INVENTION

This invention relates to a device for attaching an identification tag to an ear or the like of an animal in which a drive pin member is pivotally mounted for spring biased movement between limit positions.

Devices for attaching identification tags to ears of animals are shown in U.S. Pat. Nos. 3,731,414, 4,368,735, 4,402,320, 4,451,999 and in French Pat. No. 2,464,643.

Drive pin breakage and tag damage resulting from jerk reaction of animals, coupled with failure of the tag body and retainer assembly attached to the animal to separate from the drive pin or other portion of the tag attaching device, has been a long continuing problem.

An object of this invention is to provide such a device which holds both a tag body and a tag retainer as the tag retainer is inserted through an ear of an animal and into position in a socket in the tag body.

A further object of this invention is to provide such a device in which the drive pin upon which a retainer is mounted is re-aligned by forces produced by cooperation of the tag body and retainer incident to the assembly of the retainer and tag body.

A further object of this invention is to provide such a device in which the drive pin member is free to swing to a retainer withdrawal position so long as the free end of the drive pin is not supported through the retainer by an additional portion of the device.

A further object of this invention is to provide such a device in which a retainer and tag body assembly, supported only by the bracket portion of the device engaging the tag body, swings to facilitate withdrawal of the tag body from the bracket in response to a pulling force upon the tag body and retainer assembly.

A further object of this invention is to provide such a device which readily releases the tag body and tag retainer after assembly of the tag retainer and tag body.

A further object of this invention is to provide a device in which the drive pin is either simultaneously supported adjacent its ends or is free to tip toward alignment with pulling forces on the tag body and retainer assembly so as to substantially preclude drive pin breakage due to jerk reaction of animals.

BRIEF DESCRIPTION OF THE INVENTION

Briefly, this invention provides a tool for attaching an identification tag body and a tag retainer to an ear of an animal. The tool includes a main handle member, a first bracket pivotally mounted on the main handle member, and a second bracket member pivotally mounted on the main handle member. An opening in the first bracket receives a hollow boss of the tag body. A boss on the second bracket is received inside the hollow boss of the tag body when in a tag body supporting position. A link assembly is pivotally mounted on the main handle member and carries a drive pin member for receiving the tag retainer. The drive pin member is pivotally mounted on the link assembly and is resiliently urged toward a position in which the tag retainer enters the hollow of the boss of the tag body as the link assembly is advanced in a retainer actuating direction. Means is provided for driving the link assembly in retainer actuating direction to drive the tag retainer through the ear of the animal and into position for holding by the boss of the tag body. The second bracket is advanced to released position by the tag retainer. The first bracket can swing to free the tag and the tag retainer from the tool as the link assembly falls away from the main handle member.

The above and other objects and features of the invention will be apparent to those skilled in the art to which this invention pertains from the following detailed description and the drawings, in which:

BRIEF DESCRIPTION OF THE DRAWINGS

FIG. 1 is a view in side elevation of a tag applying tool constructed in accordance with an embodiment of this invention, an actuator spring being omitted for clarity;

FIG. 2 is a fragmentary view looking in the direction of the arrows 2—2 in FIG. 1;

FIG. 3 is a fragmentary view looking in the direction of the arrows 3—3 in FIG. 1

FIG. 3A is a perspective view of a drive pin member of the tool;

FIG. 9 is a plan view of the tag body;

FIG. 10 is a view in section taken on the line 10—10 in FIG. 9;

FIG. 11 is a plan view of the tag retainer;

FIG. 12 is a view in section taken on the line 12—12 in FIG. 11;

FIG. 13 is a view in section taken on the line 13—13 in FIG. 6, an actuating spring being shown in operative position; and FIG. 14 is a view partly in section of portions of the tag body and retainer in relation to the drive pin member.

In the following detailed description and the drawings, like characters indicate like parts.

DETAILED DESCRIPTION OF PRESENTLY PREFERRED EMBODIMENT OF THE INVENTION

Figure 4:
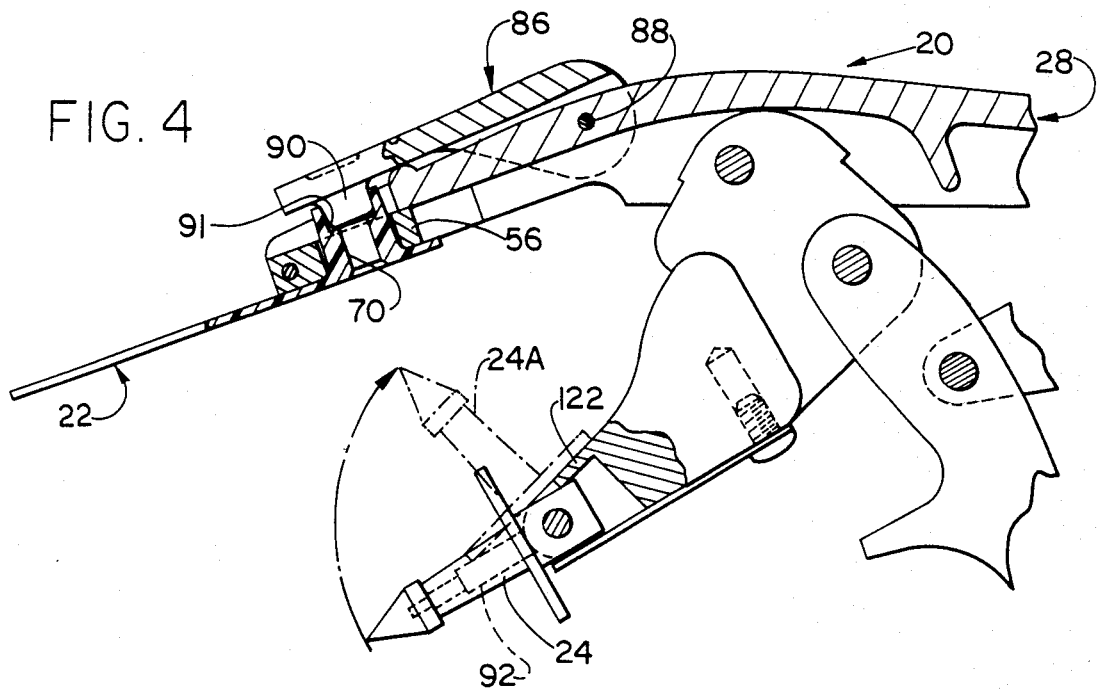
FIG. 4 is a fragmentary view partly in side elevation and partly in section of a head assembly of the tool, a tag body and a tag retainer being shown mounted thereon, the tag retainer being shown in position for mounting on the tool in full lines and in position for insertion through an ear in dot-dash lines.

In FIGS. 1–8 and 13 is shown a tool 20 for attaching an identification tag body 22 and a tag retainer 24 to an ear 26 of an animal. The tool 20 includes a main handle member 28, a link assembly 30, a link 32 and a second handle member 34. The link assembly 30 is pivotally connected to the main handle member 28 and to the second handle member 34 by pivot members 36 and 38, respectively. The link 32 is pivotally connected to the main handle member 28 and to the second handle member 34 by pivot members 40 and 42, respectively. A compression spring 44 (FIG. 13) is mounted in a socket-like spring seat 46 in the main handle member 28 and on spring lug 48 on the link 32. The compression spring 44 urges the link 32 to the open position shown in FIG. 1.

Figure 6:
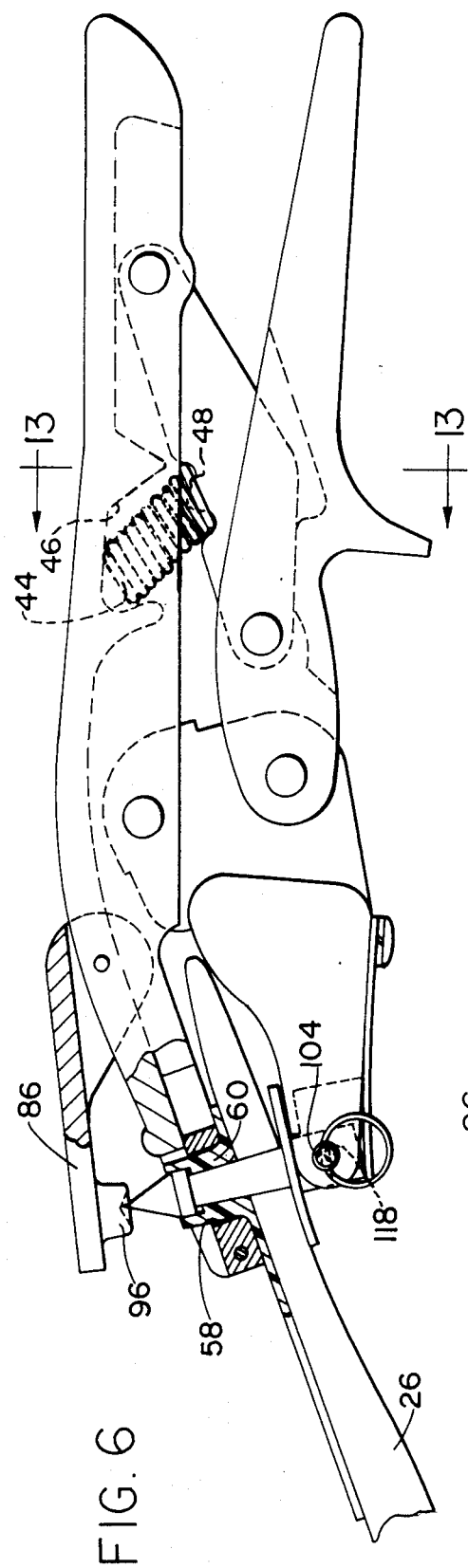
FIG. 6 is a view partly in side elevation and partly in section of the tool, the animal ear, the tag body, and the tag retainer with the tag retainer in fully inserted position.

A left hand end portion of the main handle member 28, as shown in FIGS. 1 and 2, is split to form bifurcations 50 and 52, which support a pivot pin 54. A pivoting tag support member or bracket 56 is pivotally mounted on the pivot pin 54. The pivoting tag support member 56 includes a generally cylindrical opening or socket 58, which receives a hollow boss 60 of the identification tag body 22. As shown in FIG. 6, the socket 58 is of greater diameter than the hollow boss 60 so that the boss 60 is loosely held in the socket 58 to allow for resilient temporary expansion of the boss 60 incident to passage of the retainer tip 74 into the counterbore 91 of socket 70. An edge of the socket 58 is provided with a chamfer 64 (FIG. 2) to minimize any tendency of the boss 60 to hang up inside the socket 58.

The identification tag body 22 can be of usual construction and is shown in detail in FIGS. 9 and 10. The tag body 22 includes a flat or panel portion 66 on which appropriate indicia (not shown) can be inscribed. The hollow boss 60 is mounted on a tongue portion 68 of the tag body 22 and bore 62 extends through the tongue 68 and boss 60. The bore 62 of boss 60 is counterbored to provide enlarged portion 91 of socket 70 in the boss 60 extending perpendicularly to the flat portion 66. The tag retainer 24 cooperates with the tag body 22. Details of construction of the tag retainer 24 are shown in FIGS. 11, 12 and 14. The tag retainer 24 includes a hard pointed spike or tip portion 74, which can be forced through an ear 26 of the animal. The hard tip portion 74 is mounted on a tough resilient hollow post portion 78. A flange 80 is provided on the post portion 78 remote from the hard tip portion 74. When the tag retainer 24 and the tag body 22 are assembled on the ear 26, a shoulder 82 on the post portion 78 can engage a shoulder 84 on the interior of the socket 70 of the tag body 22 to lock the tag body 22 and the tag retainer 24 in assembled relation.

The tag body 22 is held in postion on the tool 20 by a pivoted bracket 86, as shown in FIG. 6. The bracket 86 is pivotally mounted on a pivot pin 88. The pin 88 is carried by the main handle member 28. A boss 90 carried by the bracket 86 extends into a counterbore 91 of the socket 70 of the tag body 22 and engages the shoulder 84. The boss 90 is sufficiently large in diameter to be gripped frictionally by the hollow boss 60 of the tag body 22. As long as the bracket 86 is in the FIG. 4 position, the tag body 22 is held in place on the tool 20. A boss 93 on the main handle member 28 is engaged by the bracket 86 to limit swinging thereof in a counter-clockwise direction so the tongue portion 68 of the tag 22 is held in abutment with the bifurcations 50, 52 of the main handle 28 and the coplanar face of first bracket 56.

During use of the tool 20, the tag retainer 24 is mounted on a drive pin member 92. A tip portion 94 of the drive pin member 92 can be received inside a hollow portion 96 of the hard tip portion 74 of the tag retainer 24 with a shoulder 97 of the drive pin member 92 engageable with an end portion 98 of the hard tip portion 74 to correlate the hard tip in predetermined relation to the drive pin. The drive pin tip portion 94 has a rounded or otherwise relieved end to facilitate insertion of portion 94 into the hollow portion 96 of the hard tip 74 as shown in FIG. 14. Portions 99 and 100 of the drive pin member 92 can be received with a loose sliding fit in a central opening or bore 101 of the post portion 78 with the flange 80 resting on a base portion 102 of the drive pin member 92. As shown in FIG. 14, the portion 99 is of smaller diameter than bore 101 so the loose sliding fit of 99 in 101 is maintained in spite of any constriction of bore 101 as may result from the embrace of the post portion 78 by tongue 68 and boss 60 of the tag 22. The drive pin member 92 is swingably mounted on a cross rod 104. The cross rod 104 is mounted in bearing openings 106 and 108 in bifurcations 110 and 112 of bracket 114. The bracket 114 is part of the link assembly 30. A spring clip 116 received in a transverse opening 118 in an end portion of the cross rod 104 holds the cross rod 104 in position. A leaf spring 120 is mounted on the bracket 114 and can engage the base portion 102 of the drive pin 92 to urge the drive pin member 92 and the tag retainer 24 to the full line limit postion or to the dot-dash line limit position of FIG. 4. A web 122 of the bracket 114 limits swinging movement of the drive pin member 92 in its limit positions as shown in FIG. 4. The spring 120 is held by a screw fastener 123 (FIG. 1).

When the tool 20 is to be used, the drive pin member 92 is swung outwardly from the FIG. 1 position to the FIG. 4 full line position in which the portion of the pin in the retainer is shown by a dash line. The tag retainer 24 is mounted on the drive pin member 92, and the drive pin member is swung to the limit position at which the tag retainer is shown at 24A in dot-dash lines in FIG. 4.

Figure 5:
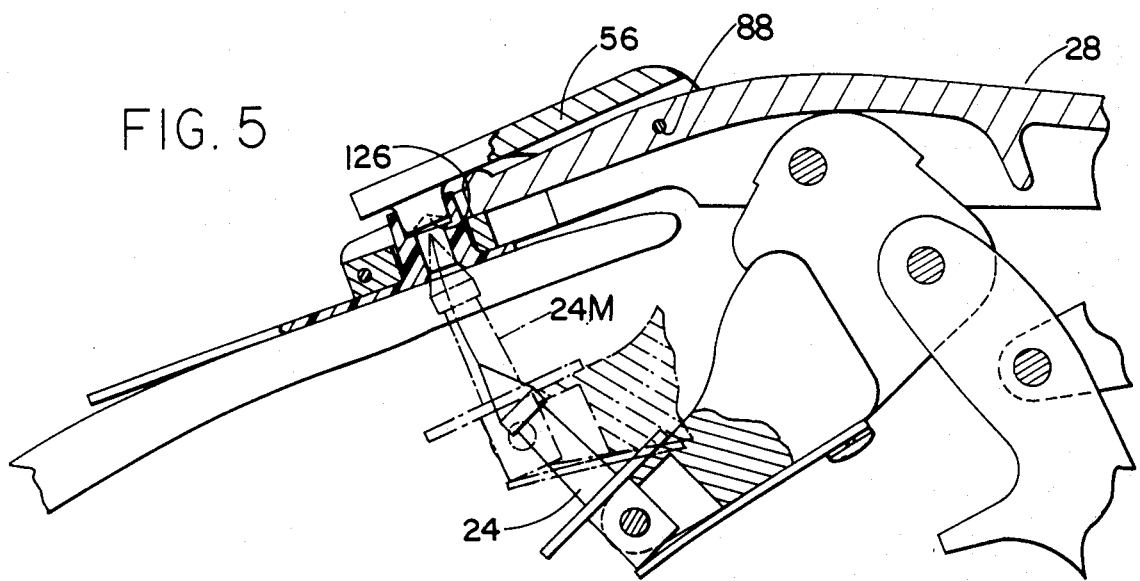
FIG. 5 is a fragmentary view partly in side elevation and partly in section of the head end of the tool, a fragmentary portion of an animal ear, the tag body and the tag retainer being shown in association therewith, the tag retainer being shown in position for starting insertion thereof in full lines and in partly inserted position in dot-dash lines.
Figure 8:
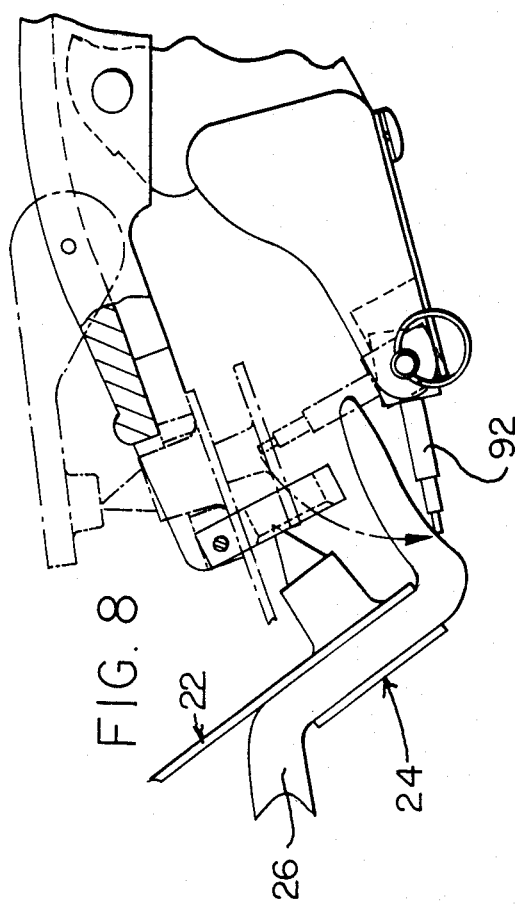
FIG. 8 is a view partly in side elevation and partly in section showing another manner of release of the tag body and the tag retainer, the tag body and the tag retainer being shown in a partly released position in dot-dash lines and in fully released position in full lines.
Figure 7:
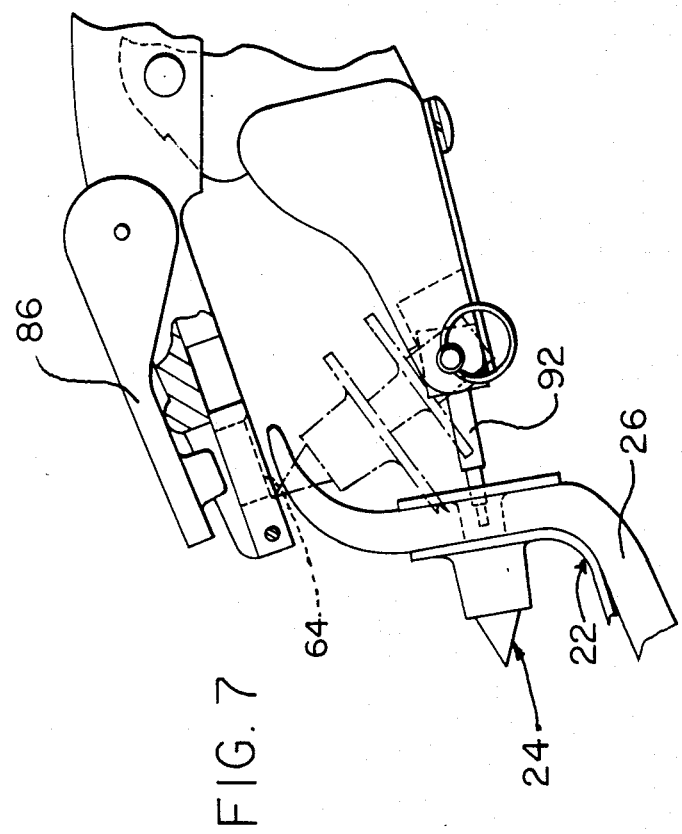
FIG. 7 is a fragmentary view partly in side elevation and partly in section showing the tool after it has been partly opened showing one manner of release of the tag body and the tag retainer.

The tag body 22 is mounted as shown in FIG. 4 with the hollow boss 60 extending through the socket 58 of the pivoting tag support member or bracket 56, and the boss 90 of the bracket 86, indexed in predetermined position by cooperation of bracket 86 with boss 93, extending into the counterbore 91 of the socket 70 to be frictionally held therein and to in turn hold the tag 22 in abutment with main handle bifurcations 50, 52 and bracket 56. The tool 20 is advanced into position surrounding the animal ear 26 as shown in FIG. 5. The handle members 28 and 34 are quickly pivoted toward each other to compress the spring 44 and advance the tag retainer from the full line position 24 of FIG. 5 through the dot-dash line position 24M to the FIG. 6 position, so that the hard pointed spike or tip portion 74 passes through the ear and into the interior of the socket 91. As the tag retainer 24 is advanced from the position 24M of FIG. 5 to the FIG. 6 position, the tip portion 74 engages conical face 126 of the boss 90 to advance the boss 90 and bracket 86 to come free of the tag body 22 while positioning the tag retainer 24 in tag retaining position. Also, as the tag retainer advances from the FIG. 5 dot-dash line position 24M to the FIG. 6 position, the drive pin 92 pivots on cross rod 104 in response to re-aligning forces generated by cooperation of tag body 22 and retainer 24, and flange 80 that is in contact with bracket 114 in position 24M of FIG. 5 is spaced from that bracket in FIG. 6 position. Then, as the handle members 28 and 34 are released, spring 44 urges them to the FIG. 1 position and the tag body 22 and the tag retainer 24 are released from the tool, either as shown in FIG. 7 or as shown in FIG. 8. When the tag body 22 and the tag retainer 24 assembly is released as shown in FIG. 7, the tag retainer 24 and the tag body 22 are advanced from the FIG. 6 position in contact with bracket 56 to the dot-dash line position of FIG. 7 and then to the full line position as they come free of the drive pin member 92 with the drive pin member 92 falling outwardly as shown. When the tag body 22 and the tag retainer 24 assembly is released as shown in FIG. 8, it first comes free from drive pin 92 and then from bracket 56 as the bracket 56 swings outwardly to permit the tag body 22 and the tag retainer 24 to be pulled therefrom.

The ear tag applying tool illustrated in the drawings and described above is subject to structural modification without departing from the spirit and scope of the appended claims.

Having described my invention what I claim as new and desire to secure by Letters Patent is:

1. A tool for attaching an identification tag body and a tag retainer to an ear of an animal which comprises a main handle member, a first bracket pivotally mounted on the main handle member, there being an opening in the first bracket for receiving a hollow boss of the tag body, a second bracket pivotally mounted on the main handle member, a boss on the second bracket receivable inside the hollow boss of the tag body when in a tag body supporting position, a link assembly pivotally mounted on the main handle member, a drive pin member for receiving the tag retainer, means for resiliently mounting the drive pin member on the link assembly and for urging the drive pin member toward a position relative to the link assembly in which the tag retainer enters the hollow of the boss of the tag body as the link assembly is advanced in a retainer actuating direction, and means for driving the link assembly in retainer actuating direction to drive the tag retainer through the ear of the animal and into position for holding by the boss of the tag body, the second bracket being urgible to released position by the tag retainer, the first bracket swinging to free the tag and the tag retainer from the tool as the link assembly falls away from the main handle member.

2. A tool as in claim 1 which includes a second handle member pivotally connected to the link assembly and a handle link member pivotally connected to the main handle member and to the second handle member, the link assembly being advanced in retainer actuating direction when the handles are advanced toward each other.

3. A tool as in claim 2 which includes a compression spring member between the handle link and the main handle member for urging the handle members to spaced position.

4. A tool as in claim 1 characterized by the fact that the said means for resiliently mounting the drive pin on the link assembly comprises a pivot member mounted on the link assembly and having an axis parallel to the axis of pivoting of the link aasembly on the main handle member and a spring member urging the drive pin member toward indexing abutment with the link assembly when the drive pin is in respective retainer actuating position and also when in assembled tag and tag retainer doffing position.

5. A tool for attaching an identification tag body and a tag retainer to an ear of an animal which comprises a main handle member, a first bracket pivotally mounted on the main handle member, there being an opening in the first bracket for receiving a hollow boss of the tag body, a second bracket pivotally mounted on the main handle member, a boss on the second bracket receivable inside and grippable by the hollow boss of the tag body when in a tag body supporting position, a link assembly pivotally mounted on the main handle member, a drive pin member for receiving the tag retainer, means for urging the drive pin member toward a position in which the tag retainer enters the hollow of the boss of the tag body as the link assembly is advanced in a retainer actuating direction, and means for driving the drive pin in retainer actuating direction to drive the tag retainer through the ear of the animal and into position for holding by the boss of the tag body, the second bracket being urgeable from the tag boss gripped position to released position by the tag retainer, the first bracket swinging to free the tag and the tag retainer from the tool as the drive pin falls away from the tag retainer.

6. A tool for attaching an identification tag body and a tag retainer to an ear of an animal which comprises a main handle member, there being an opening in the main handle member for receiving a hollow boss of the tag body, a bracket pivotally mounted on the main handle member, a boss on the bracket receivable inside and gripped by the hollow boss of the tag body in said opening when said bracket boss is in a tag body supporting position, a link assembly pivotally mounted on the main handle member, a drive pin member for receiving the tag retainer, means pivotally mounting the drive pin member on the link assembly for pivoting on an axis parallel to the pivot axis of mounting of the link assembly on the main handle member, means resiliently urging the drive pin member toward a position relative to the link assembly in which the tag retainer enters the hollow of the boss of the tag body as the link assembly is advanced in a retainer actuating direction, and means for driving the link assembly in retainer actuating direction to drive the tag retainer through the ear of the animal and into position for holding by the boss of the tag body, the boss of the bracket being urged from the grip of the hollow boss of the tag body to tag released position by the tag retainer as it is advanced into the tag boss, the assembled tag and tag retainer being withdrawn from the opening with and as the drive pin is retracted and the drive pin thereafter being pivotable to doff the tag and tag retainer in response to animal produced forces.

7. A tool for attaching an identification tag body and a tag retainer to an ear of an animal which comprises a main handle member, a first bracket pivotally mounted on the main handle member, there being an opening in the first bracket for receiving a hollow boss of the tag body, a second bracket pivotally mounted on the main handle member, a boss on the second bracket receivable inside the hollow boss of the tag body when said bracket boss is in a tag body supporting position, a link assembly pivotally mounted on the main handle member, a drive pin member for receiving the tag retainer, means for resiliently mounting the drive pin member on the link assembly and for urging the drive pin member toward a position relative to the link assembly in which the tag retainer enters the hollow of the boss of the tag body as the link assembly is advanced in a retainer actuating direction, and means for driving the link assembly in retainer actuating direction to drive the tag retainer through the ear of the animal and into position for holding by the boss of the tag body, the second bracket being urgable to released position by the tag retainer, the first bracket swinging to free the tag and the tag retainer from the tool when the drive pin has been first disengaged from the tag retainer and the drive pin swinging to free the tag and tag retainer when the tag has been first disengaged from the first bracket.

* * * * *